United States Patent
Ahn et al.

(10) Patent No.: US 10,405,288 B2
(45) Date of Patent: Sep. 3, 2019

(54) SUPPORTING VARIOUS BANDWIDTH

(71) Applicant: LG ELECTRONICS INC., Seoul (KR)

(72) Inventors: Joonkui Ahn, Seoul (KR); Kijun Kim, Seoul (KR); Eunsun Kim, Seoul (KR); Yunjung Yi, Seoul (KR)

(73) Assignee: LG ELECTRONICS INC., Seoul (KR)

(*) Notice: Subject to any disclaimer, the term of this patent is extended or adjusted under 35 U.S.C. 154(b) by 225 days.

(21) Appl. No.: 15/442,593

(22) Filed: Feb. 24, 2017

(65) Prior Publication Data

US 2017/0251475 A1   Aug. 31, 2017

Related U.S. Application Data

(60) Provisional application No. 62/300,036, filed on Feb. 25, 2016.

(51) Int. Cl.
*H04W 72/04* (2009.01)
*H04W 56/00* (2009.01)
*H04L 5/00* (2006.01)

(52) U.S. Cl.
CPC ....... *H04W 56/0015* (2013.01); *H04L 5/0048* (2013.01)

(58) Field of Classification Search
CPC ......... H04W 56/0015; H04W 72/0453; H04W 72/0446; H04L 5/00
See application file for complete search history.

(56) References Cited

U.S. PATENT DOCUMENTS

| | | | | |
|---|---|---|---|---|
| 2001/0044712 A1* | 11/2001 | Vainio | ..................... | G10L 19/18 704/201 |
| 2008/0095108 A1* | 4/2008 | Malladi | .................. | H04B 1/713 370/329 |
| 2009/0136034 A1* | 5/2009 | Gaal | ....................... | G06F 7/584 380/268 |
| 2009/0196163 A1* | 8/2009 | Du | ........................ | H04L 5/0046 370/204 |
| 2014/0112261 A1* | 4/2014 | Chen | .................... | H04B 7/2656 370/329 |
| 2015/0333880 A1* | 11/2015 | Yi | .......................... | H04L 5/001 370/329 |

* cited by examiner

*Primary Examiner* — Edan Orgad
*Assistant Examiner* — Nourali Mansoury
(74) *Attorney, Agent, or Firm* — Lee, Hong, Degerman, Kang & Waimey (57) ABSTRACT

Provided is a communication method for supporting various bandwidths. The device detects a synchronization signal transmitted by a wide-band cell and receives a downlink (DL) signal from the wide-band cell on the basis of the synchronization signal. A support bandwidth supported by the device is narrower than a system bandwidth supported by the wide-band cell.

16 Claims, 7 Drawing Sheets

SUPPORTING VARIOUS BANDWIDTH

CROSS-REFERENCE TO RELATED APPLICATIONS

Pursuant to 35 U.S.C. § 119(e), this application claims the benefit of U.S. Provisional Patent Application No. 62/300,036, filed on Feb. 25, 2016, the contents of which are hereby incorporated by reference herein in its entirety.

BACKGROUND OF THE INVENTION

Field of the Invention

The present invention relates to wireless communication, and more particularly, to a method of supporting various bandwidths, and an apparatus using the method.

Related Art

A next-generation wireless communication system is required to support various user environments and greater communication capacity. Representative issues considered in the next-generation system include a massive machine type communications (MTC) which provides various services anytime anywhere by connecting a plurality of devices, ultra-reliable and low-latency communications (URLLC) considering a service which is sensitive to reliability and latency, or the like.

The next-generation system necessarily supports a greater bandwidth than a legacy system, but also needs to consider compatibility with the legacy system.

SUMMARY OF THE INVENTION

Proposed is a method for downlink communication in a system supporting various bandwidths.

In an aspect, a method for communication in a wireless communication system includes detecting, by a wireless device, a synchronization signal transmitted by a wide-band cell, and receiving, by the wireless device, a downlink (DL) signal from the wide-band cell on the basis of the synchronization signal. A support bandwidth supported by the wireless device is narrower than a system bandwidth supported by the wide-band cell.

The system bandwidth may comprise a plurality of narrow bands, and the synchronization signal may be received in one of the plurality of narrow bands.

In another aspect, an apparatus in a wireless communication system includes a transceiver configured to transmit and receive a radio signal, and a processor operatively coupled to the transceiver. The processor is configured to detect a synchronization signal transmitted by a wide-band cell via the transceiver, and receive a downlink (DL) signal from the wide-band cell via the transceiver on the basis of the synchronization signal. A support bandwidth supported by the apparatus is narrower than a system bandwidth supported by the wide-band cell.

In an environment where many devices for supporting various bandwidths are present, each device may receive a communication service according to a bandwidth thereof.

DESCRIPTION OF EXEMPLARY EMBODIMENTS

A wireless device may be fixed or mobile, and may be referred to as another terminology, such as a user equipment (UE), a mobile station (MS), a mobile terminal (MT), a user terminal (UT), a subscriber station (SS), a personal digital assistant (PDA), a wireless modem, a handheld device, etc. The wireless device may also be a device supporting only data communication such as a machine-type communication (MTC) device.

A base station (BS) is generally a fixed station that communicates with the wireless device, and may be referred to as another terminology, such as an evolved-NodeB (eNB), a base transceiver system (BTS), an access point, etc.

Hereinafter, it is described that the present invention is applied according to a 3rd generation partnership project (3GPP) long term evolution (LTE) based on 3GPP technical specification (TS). However, this is for exemplary purposes only, and thus the present invention is also applicable to various wireless communication networks.

Figure 1:
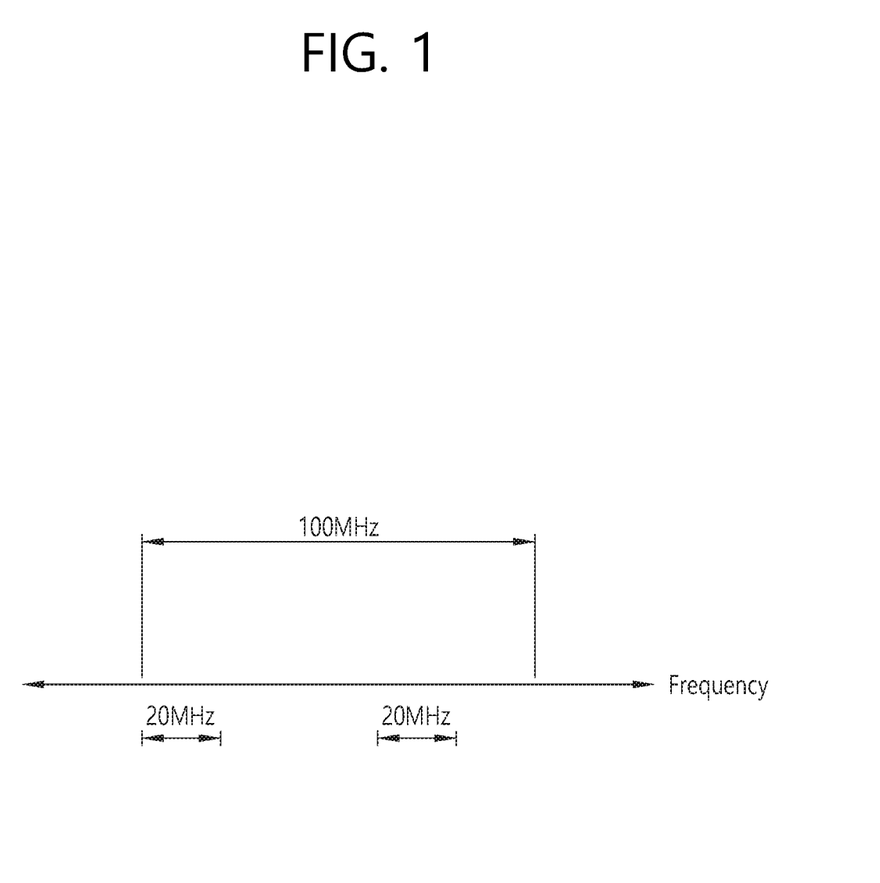
FIG. 1 shows an example of a system to which various bandwidths are applied.

FIG. 1 shows an example of a system to which various bandwidths are applied.

At present, in 3GPP LTE, one cell supports a system bandwidth of up to 20 MHz. However, it is considered that one wide-band cell supports a system bandwidth of up to 100 MHz.

A wireless device supporting the entire system bandwidth is called a wide band (WB) UE, and a wireless device supporting a smaller bandwidth is called a narrow band (NB) UE. For example, the WB UE may support a bandwidth of up to 100 MHz, and the NB UE may support a bandwidth of up to 20 MHz. This is for exemplary purposes only, and thus a size of the bandwidth is not limited thereto.

When a network operates in the wide-band cell with the system bandwidth of 100 MHz, the WB UE may successfully perform downlink (DL) communication. However, there is a need to design a DL signal so that the NB UE is also served in the wide-band cell without an additional network investment.

Figure 2:
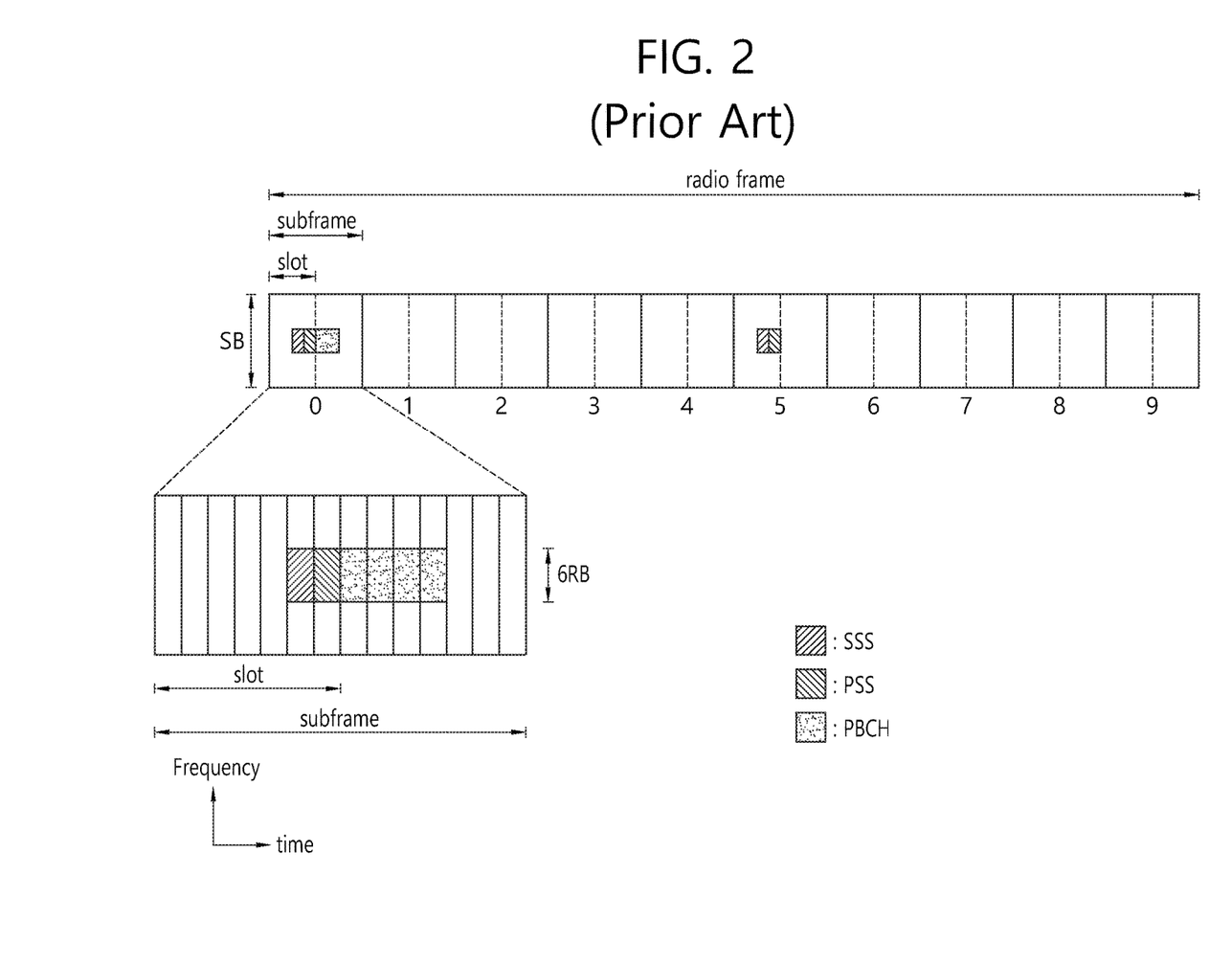
FIG. 2 shows an example of a downlink (DL) signal in the conventional 3rd generation partnership project (3GPP) long term evolution (LTE).

FIG. 2 shows an example of a DL signal in the conventional 3GPP LTE.

A radio frame includes 10 subframes indexed with 0 to 9. One subframe includes 2 consecutive slots. A time required for transmitting one subframe is defined as a transmission time interval (TTI). For example, one subframe may have a length of 1 millisecond (ms), and one slot may have a length of 0.5 ms. One slot may include a plurality of orthogonal frequency division multiplexing (OFDM) symbols in a time domain. Since the 3GPP LTE uses orthogonal frequency division multiple access (OFDMA) in a downlink (DL), the OFDM symbol is only for expressing one symbol period in the time domain, and there is no limitation in a multiple access scheme or terminologies. For example, the OFDM symbol may also be referred to as another terminology such as a single carrier frequency division multiple access (SC-FDMA) symbol, a symbol period, etc. Although it is described that one slot includes 7 OFDM symbols for example, the number of OFDM symbols included in one slot may vary depending on a length of a cyclic prefix (CP).

A resource block (RB) is a resource allocation unit, and includes a plurality of subcarriers in one slot. For example, if one slot includes 7 OFDM symbols in a time domain and the RB includes 12 subcarriers in a frequency domain, one RB can include 7-12 resource elements (REs).

A synchronization signal includes a primary synchronization signal (PSS) and a secondary synchronization signal (SSS), and is used for cell discovery. The PSS is transmitted in a last OFDM symbol of a 1st slot (a 1st slot of a 1st subframe (a subframe with an index 0)) and an 11th slot (a 1st slot of a 6th subframe (a subframe with an index 5)). The PSS is used to obtain OFDM symbol synchronization or slot synchronization, and is associated with a physical cell identity (PCI) which is a unique identifier of each cell. The SSS is used to obtain the PCI together with the PSS. The SSS includes a 1st SSS and a 2nd SSS. The 1st SSS is transmitted in the previous OFDM symbol of the PSS in the 1st slot, and the 2nd SSS is transmitted in the previous OFDM symbol of the PSS in the 11th slot.

A physical broadcast channel (PBCH) is transmitted in first four OFDM symbols in a 2nd slot of a 1st subframe of a radio frame. The PBCH carries system information necessary for communication between a wireless device and a BS. The system information transmitted through the PBCH is referred to as a master information block (MIB).

In the 3GPP LTE, the PSS, the SSS, and the PBCH may always be transmitted in center 6 RBs inside the system bandwidth, and thus may be detected by the wireless device irrespective of the system bandwidth. This has an advantage in that all wireless devices can detect a cell irrespective of the system bandwidth. That is, a WB UE which supports a 100 MHz bandwidth may detect a cell having the 100 MHz bandwidth by receiving the PSS/SSS/PBCH in the center 6 RBs. Likewise, an NB UE which supports a 20 MHz bandwidth may detect a cell having the 20 MHz bandwidth by receiving the PSS/SSS/PBCH in the center 6 RBs.

However, there is a problem in that the above structure cannot support various bandwidths. This is because the PSS/SSS/PBCH are transmitted at a fixed location irrespective of the system bandwidth.

Assume that there is a cell which supports the 100 MHz bandwidth (such a cell is called a wide-band cell). A WB UE which supports the 100 MHz bandwidth can successfully detect the cell. However, although an NB UE which supports the 20 MHz bandwidth can receive the PSS/SSS/PBCH in the center 6 RBs of the wide-band cell, it cannot know that a system bandwidth of the wide-band cell is 100 MHz. Therefore, it may be difficult for the NB UE to receive a normal service from the wide-band cell.

Although it is premised hereinafter that the wide-band cell has a system bandwidth of 100 MHz, this is for exemplary purposes only. A wireless device which supports a system bandwidth of the wide-band cell is called a WB UE, and a wireless device which supports a smaller bandwidth than the system bandwidth of the wide-band cell is called an NB UE. A band used by the NB UE in a system band (SB) of the wide-band cell is called an NB.

Hereinafter, a scrambling sequence structure and DL signal transmission capable of simultaneously supporting the NB UE and the WB UE are provided.

A DL signal may include at least one of a reference signal (RS), a synchronization signal, a physical downlink shared channel (PDSCH), a physical downlink control channel (PDCCH), and a sounding reference signal. The scrambling sequence is a sequence applied to scrambling of the DL signal. The scrambling may be bit-level scrambling or symbol-level scrambling.

Figure 3:
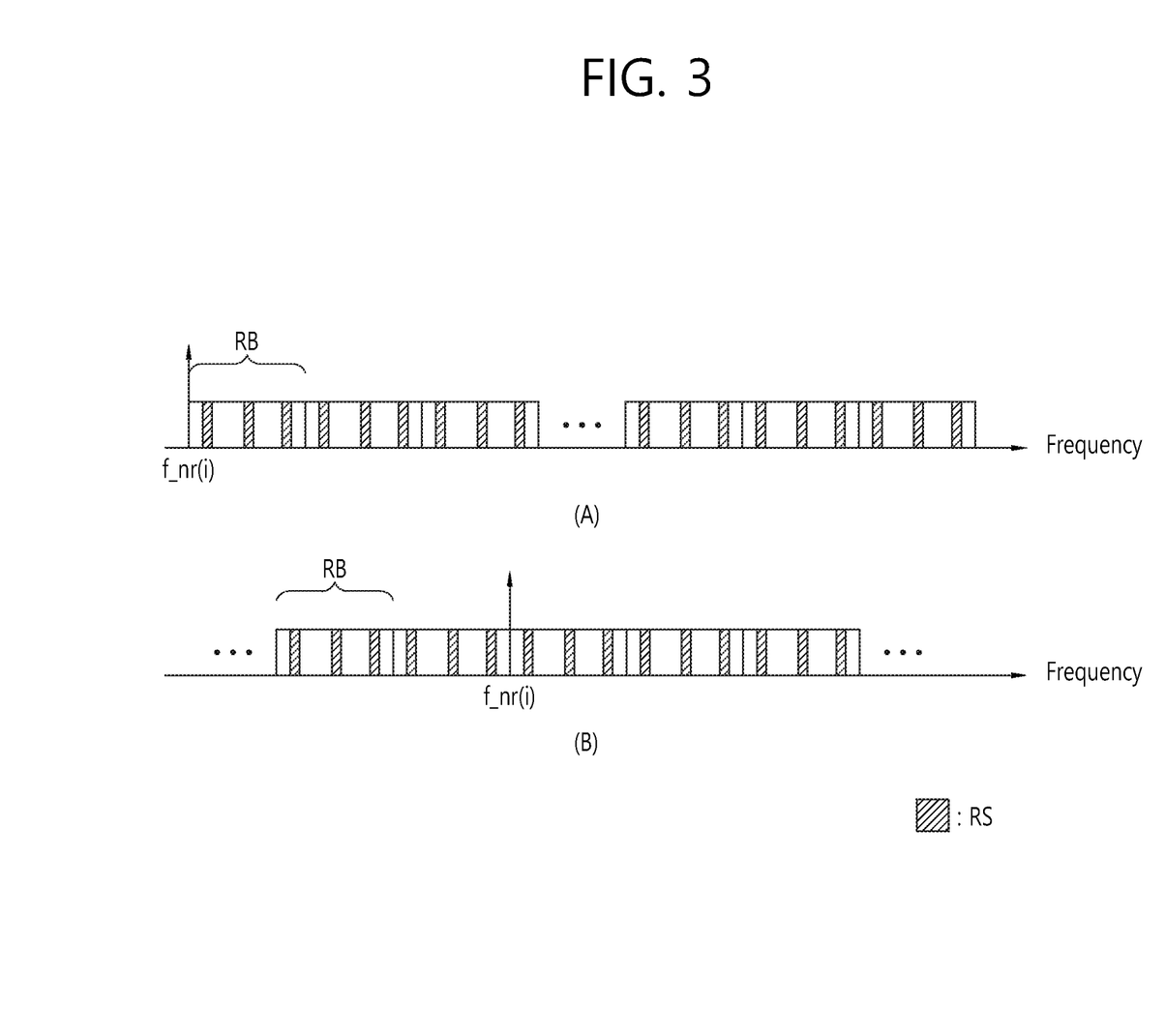
FIG. 3 shows an arrangement of a DL signal according to an embodiment of the present invention.

FIG. 3 shows an arrangement of a DL signal according to an embodiment of the present invention.

The DL signal and a scrambling sequence are arranged by using a function of an absolute frequency value. A frequency band i used in a wide-band cell is defined as B_nr(i), and a predetermined reference frequency value in B_nr(i) is defined as f_nr(i).

In a system band, the DL signal is arranged on the basis of f_nr(i). The sub-figure (A) shows an example of an RB arrangement for an RS when f_nr(i) is defined as a lowest frequency value in the system band. The sub-figure (B) shows an example of an RB arrangement for an RS when f_nr(i) is defined as a center frequency value in the system band.

Figure 4:
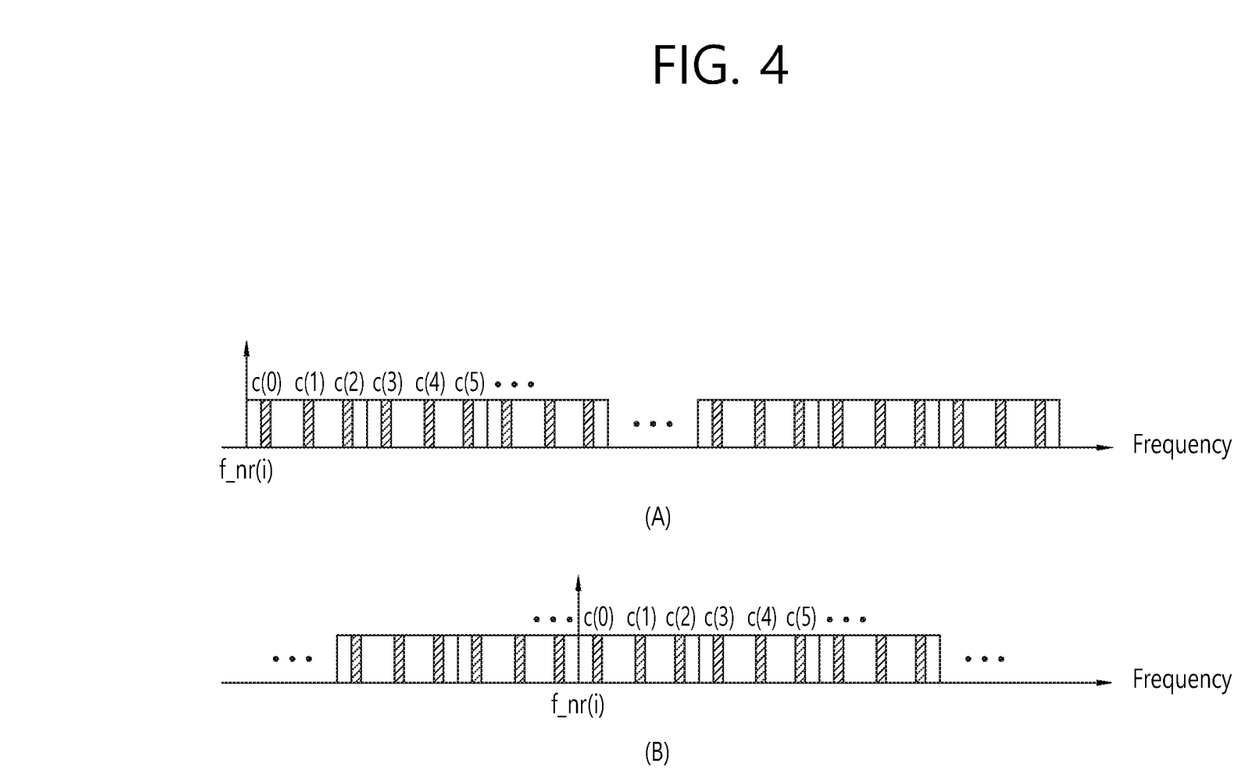
FIG. 4 shows an arrangement of a scrambling sequence according to an embodiment of the present invention.

FIG. 4 shows an arrangement of a scrambling sequence according to an embodiment of the present invention.

A DL signal and the scrambling sequence are arranged by using a function of an absolute frequency value. A frequency band i used in a wide-band cell is defined as B_nr(i), and a predetermined reference frequency value in B_nr(i) is defined as f_nr(i).

A scrambling sequence c(x) is arranged in an orderly manner at a frequency position of a signal to which a corresponding scrambling sequence is applicable on the basis of f_nr(i). The sub-figure (A) shows an example of a scrambling sequence arrangement when f_nr(i) is defined as a lowest frequency value in a system band. The sub-figure (B) shows an example of a scrambling sequence arrangement when f_nr(i) is defined as a center frequency value in the system band.

In the embodiment of FIG. 3 or FIG. 4, a UE knows in advance f_nr(i) for a frequency band i, in which the UE intends to perform DL reception, and an arrangement of a DL signal and a scrambling sequence on the basis thereof. Therefore, a WB UE or an NB UE may receive the DL signal by accessing a wide-band cell.

If it is assumed that the UE can flexibly detect a change in the arrangement of the DL signal and the scrambling sequence within a specific frequency range, f_nr(i) and the arrangement of the DL signal and the scrambling sequence may have a flexibility by an amount of a specific offset (e.g., ±Δf_nr) on the basis of f_nr(i).

Figure 5:
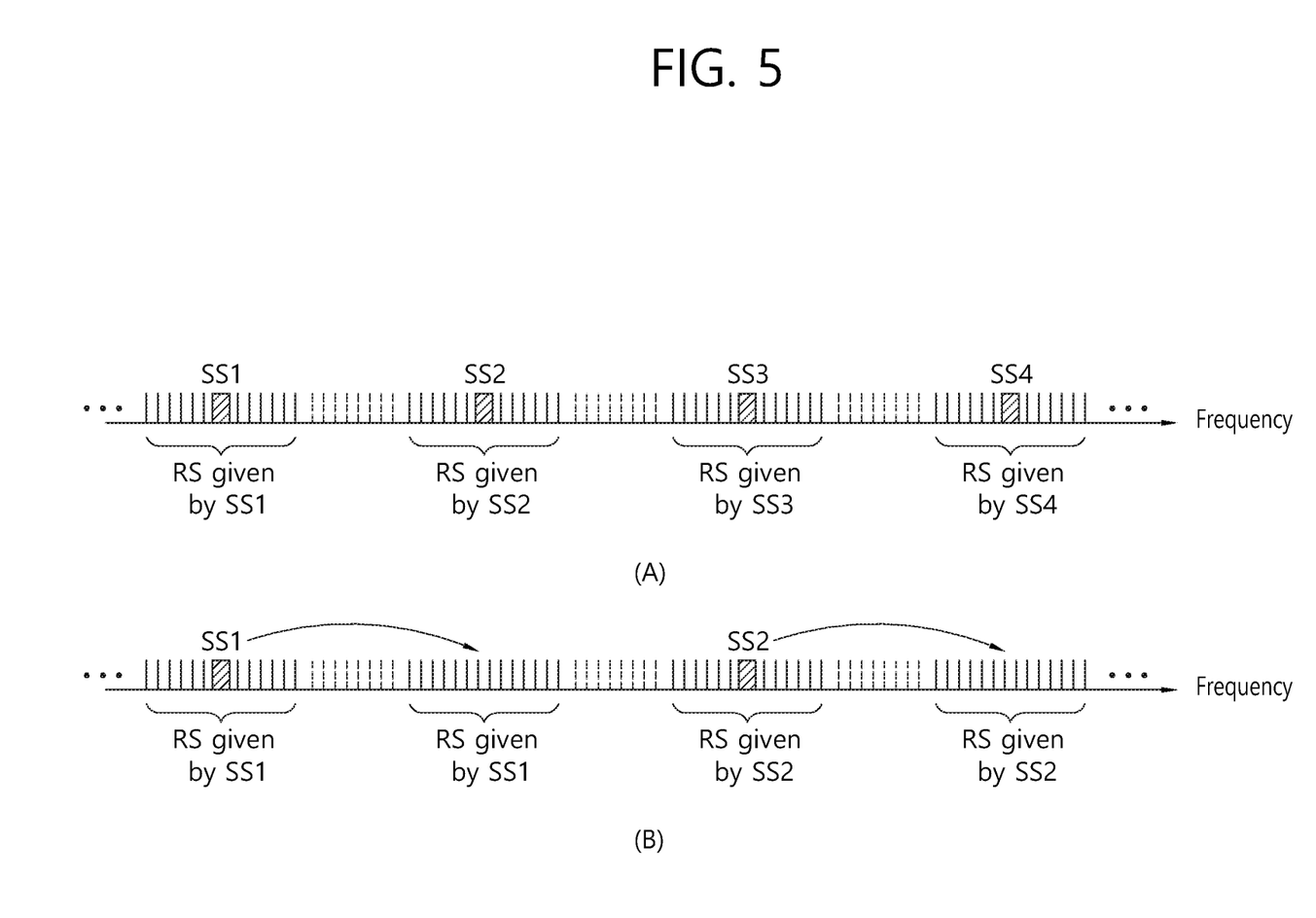
FIG. 5 shows an arrangement of a DL signal according to another embodiment of the present invention.

FIG. 5 shows an arrangement of a DL signal according to another embodiment of the present invention.

An NB signal is a signal that can be received by an NB UE in an NB within a system band of a wide-band cell. An arrangement of the DL signal and a scrambling sequence may be defined according to a relative location for the NB signal. The NB signal may include a broadcast signal or a synchronization signal (SS) which must be first detected by the NB UE to obtain DL synchronization.

The NB UE first detects the NB signal. In addition, the NB UE may obtain the arrangement of the DL signal and the scrambling sequence of the wide-band cell on the basis of the NB signal. The NB UE may determine the arrangement of the DL signal and the scrambling sequence of the wide-band cell by using a sequence type for the NB signal and/or information included in the NB signal. The NB UE may receive the DL signal under the assumption that the DL signal and the scrambling sequence are arranged according to a predetermined relative frequency/time position for the NB signal.

The sub-figure (A) shows an example in which an SB of a wide-band cell includes a plurality of NBs, and an SS is transmitted as the NB signal in each NB. The SS may be transmitted on the basis of a center frequency of each NB. Upon detecting the SS, the NB UE may assume that an RS to which a scrambling sequence corresponding to a sequence type of the SS is applied is transmitted in an NB with its center at a location of the SS. For example, an SS1 is transmitted in a 1st NB. Upon receiving the SS1, the NB UE may assume that an RS to which a scrambling sequence corresponding to the SS1 is applied is transmitted.

More specifically, an example of defining a scrambling sequence and an RS from an NB signal is as follows.

Bit-level scrambling is assumed. For a bit sequence b(i) of a DL signal for a wide-band cell, a scrambling sequence c(i) may be scrambled with (b(i)+c(i)) mod 2. The scrambling sequence c(i) may be defined as an m-sequence as follows.

$$c(n) = (x_1(n+N_C) + x_2(n+N_C)) \bmod 2$$

$$x_1(n+31) = (x_1(n+3) + x_1(n)) \bmod 2$$

$$x_2(n+31) = (x_2(n+3) + x_2(n+2) + x_2(n+1) + x_2(n)) \bmod 2 \quad \text{[Equation 1]}$$

Herein, Nc is a predetermined value. The scrambling sequence may be initialized on the basis of a value obtained from an NB signal. For example, the scrambling sequence may be initialized to $N_{cell\_ID} + I_{NB}$. $N_{cell\_ID}$ is an ID of a wide-band cell, and $I_{NB}$ is a value obtained from an SS (PSS and/or SSS) of an NB in which the SS is detected.

It is assumed that a sequence for an RS of the wide-band cell is determined as follows.

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

An m-sequence c(i) may be given by the above equation 1, and c(i) may be initialized to to $N_{cell\_ID} + I_{NB}$.

The sub-figure (B) shows an example in which an SB of a wide-band cell transmits an NB signal only in some bands among a plurality of NBs. Among four NBs, an SS1 is transmitted in a 1st NB, and an SS2 is transmitted in a 3rd NB. An SS is not transmitted in a 2nd NB and a 4th NB. However, the 2nd NB and the 4th NB are associated with an NB in which the SS is transmitted. For example, it is assumed that the 2nd NB is associated with the 1st NB, and the 4th NB is associated with the 3rd NB. Upon detecting the SS, the NB UE may assume that an RS to which a scrambling sequence corresponding to a sequence type of the SS is applied is transmitted in an NB associated with the NB in which the SS is detected.

The entire SB of the wide-band cell may include the plurality of NB bands only. Alternatively, a part of the SB of the wide-band cell may include the plurality of NBs.

Figure 6:
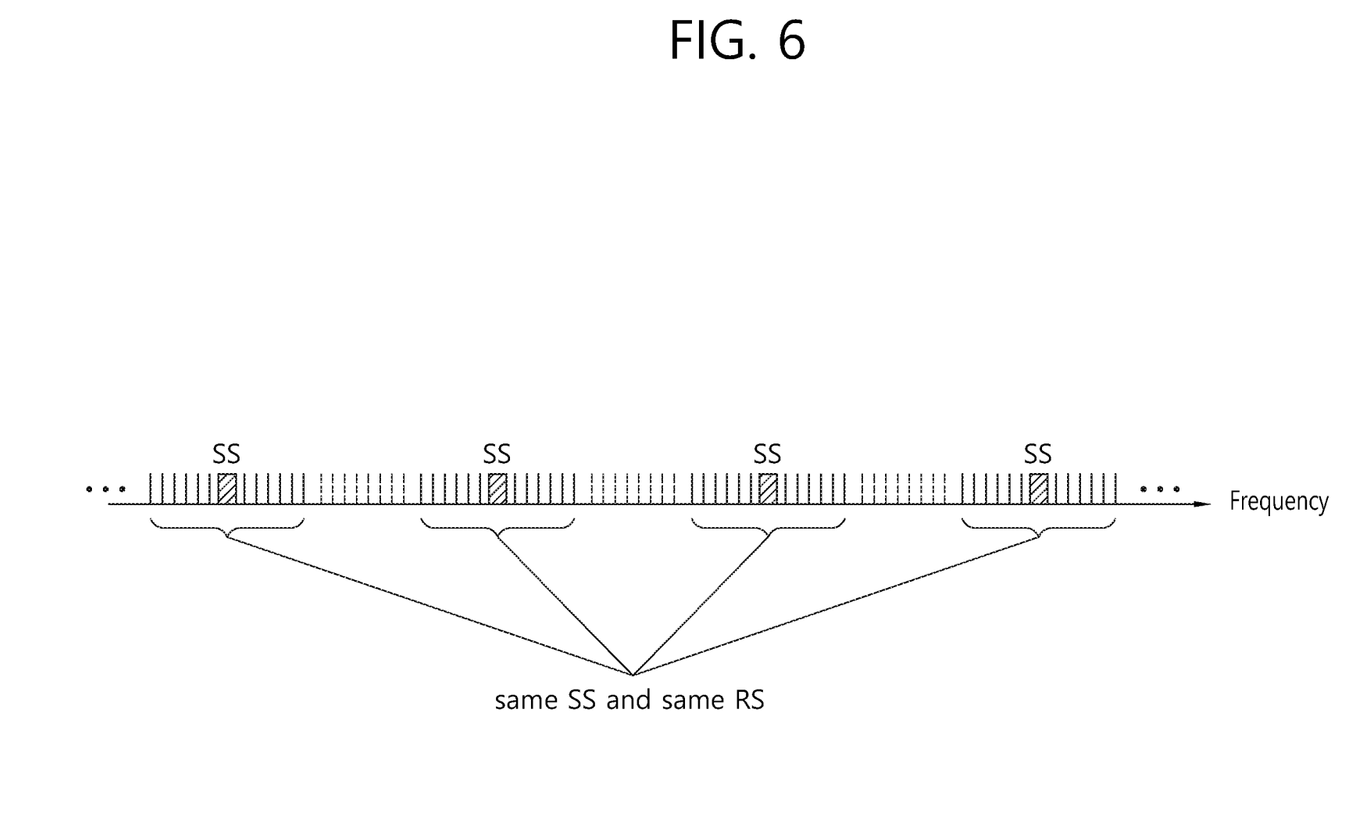
FIG. 6 shows an arrangement of a DL signal according to another embodiment of the present invention.

FIG. 6 shows an arrangement of a DL signal according to another embodiment of the present invention.

An SB of a wide-band cell includes a plurality of NBs. The entire SB of the wide-band cell may include a plurality of adjacent NB bands only. Alternatively, a part of the SB of the wide-band cell may include a plurality of NBs.

The same DL signal and the same scrambling sequence may be applied for a plurality of NBs in the SB. An NB UE may know in advance an available NB in the SB, or may know the existence of the NB through an NB signal. An arrangement of the scrambling sequence and DL signal transmitted in each NB may be applied equally for a plurality of NB bands in the SB. For example, the same RS is transmitted in all four NBs. The NB UE may receive the DL signal from any NB.

Instead of arranging the same DL signal and the same scrambling sequence in all available NBs in the SB, this arrangement may be applied only to an NB band in which a BS intends to actually operate the NB UE. The arrangement of the DL signal and the scrambling sequence in the SB may be reported to a WB UE through additional signaling.

Figure 7:
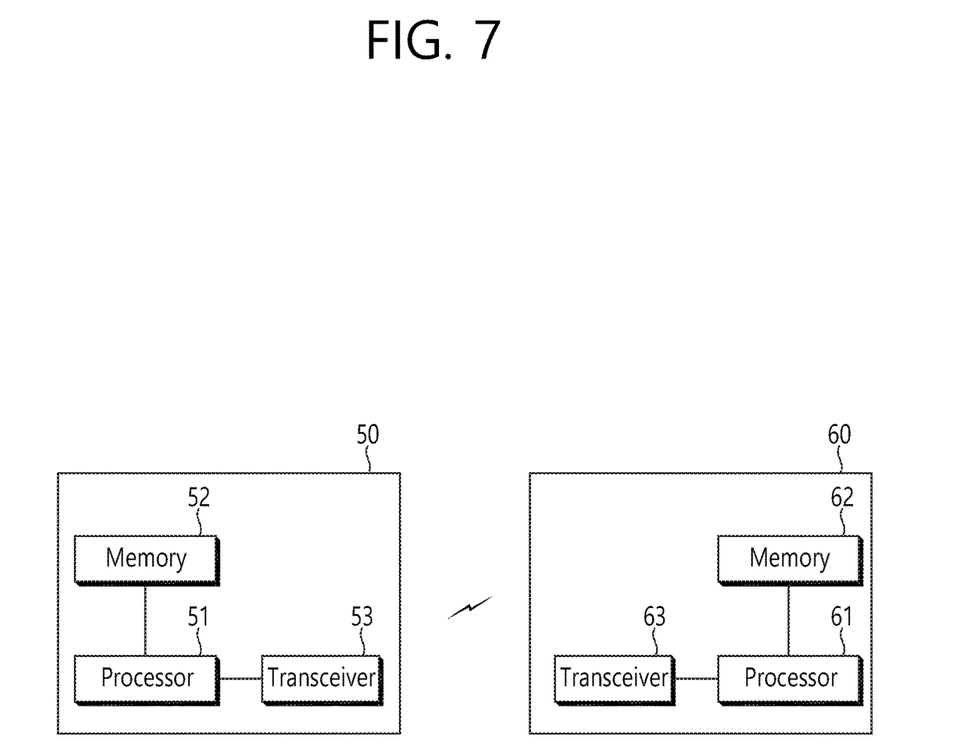
FIG. 7 is a block diagram showing a wireless communication system according to an embodiment of the present invention.

FIG. 7 is a block diagram showing a wireless communication system according to an embodiment of the present invention.

A wireless device 50 includes a processor 51, a memory 52, and a transceiver 53. The memory 52 is coupled to the processor 51, and stores various instructions executed by the processor 51. The transceiver 53 is coupled to the processor 51, and transmits and/or receives a radio signal. The processor 51 implements the proposed functions, procedures, and/or methods. In the aforementioned embodiment, an operation of the UE may be implemented by the processor 51. When the aforementioned embodiment is implemented with a software instruction, the instruction may be stored in the memory 52, and may be executed by the processor 51 to perform the aforementioned operation.

A BS 60 includes a processor 61, a memory 62, and a transceiver 63. The BS 60 may operate in an unlicensed band. The memory 62 is coupled to the processor 61, and stores various instructions executed by the processor 61. The transceiver 63 is coupled to the processor 61, and transmits and/or receives a radio signal. The processor 61 implements the proposed functions, procedures, and/or methods. In the aforementioned embodiment, an operation of the BS may be implemented by the processor 61.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The transceiver unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method in a wireless communication system, the method comprising:
   detecting, by a wireless device supporting a first narrow band, a first synchronization signal, wherein the first synchronization signal is transmitted through the first narrow band by a wide-band cell, wherein the first narrow band is included in a system band supported by the wide-band cell; and receiving, by the wireless device, a downlink (DL) signal from the wide-band cell based on the first synchronization signal, wherein the first narrow band is narrower than the system band, wherein a resource arrangement of the DL signal and a scrambling sequence within the system band is determined based on the first synchronization signal, wherein the resource arrangement and the scrambling sequence is started from a reference frequency, wherein the scrambling sequence is a sequence applied to scrambling of the DL signal, and wherein the reference frequency is a lowest frequency of the system band.

2. The method of claim 1, wherein:

the scrambling sequence and a location of a DL reference signal (RS) within the first narrow band are detected based on the first synchronization signal; and the DL RS is included in the DL signal.

3. The method of claim 1, wherein receiving the DL signal comprises obtaining the scrambling sequence based on the first synchronization signal.

4. The method of claim 1, wherein receiving the DL signal comprises obtaining a resource for receiving the DL signal based on the first synchronization signal.

5. The method of claim 1, wherein the system band comprises a plurality of narrow bands including the first narrow band and a second narrow band.

6. The method of claim 5, wherein a same synchronization signal is received in each of the plurality of narrow bands.

7. The method of claim 5, wherein:

the DL signal is received in the first narrow band in which the first synchronization signal is received; and the DL signal is received in the second narrow band in which a second synchronization signal is not received.

8. The method of claim 1, wherein the first synchronization signal comprises at least a primary synchronization signal or a secondary synchronization signal.

9. An apparatus supporting a first narrow band in a wireless communication system, the apparatus comprising:

a transceiver that transmits and receives a radio signal; and a processor operatively coupled to the transceiver and that:

detects a first synchronization signal, wherein the first synchronization signal is transmitted through the first narrow band by a wide-band cell, wherein the first narrow band is included in a system band supported by the wide-band cell; and receives a downlink (DL) signal from the wide-band cell via the transceiver based on the first synchronization signal, wherein the first narrow band is narrower than the system band, wherein a resource arrangement of the DL signal and a scrambling sequence within the system band is determined based on the first synchronization signal, wherein the resource arrangement and the scrambling sequence is started from a reference frequency, wherein the scrambling sequence is a sequence applied to scrambling of the DL signal, and wherein the reference frequency is a lowest frequency of the system band.

10. The apparatus of claim 9, wherein:

the scrambling sequence and a location of a DL reference signal (RS) within the first narrow band are detected based on the first synchronization signal; and the DL RS is included in the DL signal.

11. The apparatus of claim 9, wherein the processor receives the DL signal by obtaining the scrambling sequence based on the first synchronization signal.

12. The apparatus of claim 9, wherein the processor receives the DL signal by obtaining a resource for receiving the DL signal based on the first synchronization signal.

13. The apparatus of claim 9, wherein the system band comprises a plurality of narrow bands including the first narrow band and a second narrow band.

14. The apparatus of claim 13, wherein a same synchronization signal is received in each of the plurality of narrow bands.

15. The apparatus of claim 13 wherein:

the DL signal is received in the first narrow band in which the first synchronization signal is received; and the DL signal is received in the second narrow band in which a second synchronization signal is not received.

16. The apparatus of claim 9, wherein the first synchronization signal comprises at least a primary synchronization signal or a secondary synchronization signal.

* * * * *